No. 895,207. PATENTED AUG. 4, 1908.
L. P. SCHRAMM.
NUT LOCK.
APPLICATION FILED MAR. 13, 1908.
Fig 1.
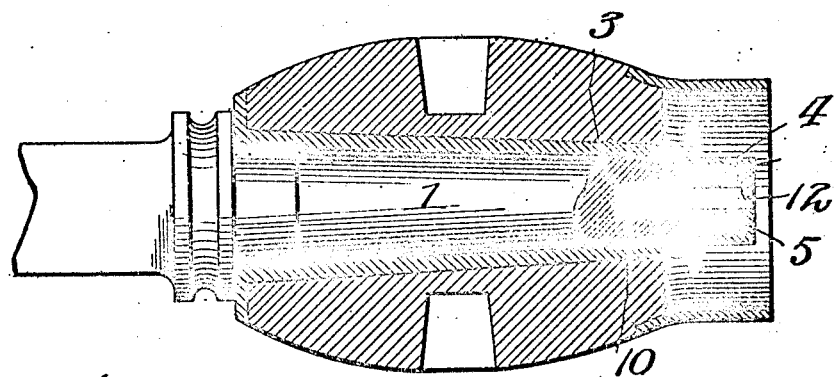
Fig 2.
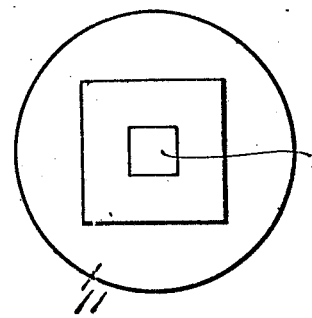
Fig 3.
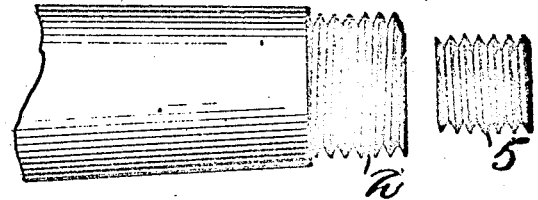
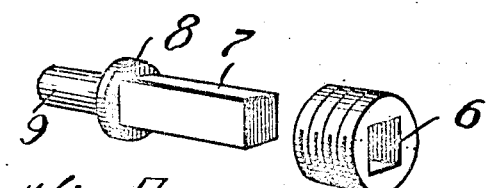
Fig 4.
Witnesses
Hugh H. Ott.
Wm. North.
Inventor
Louis P. Schramm.
By Victor J. Evans
Attorney

UNITED STATES PATENT OFFICE.

LOUIS P. SCHRAMM, OF TOLEDO, OHIO.

NUT-LOCK.

No. 895,207.  Specification of Letters Patent.  Patented Aug. 4, 1908.

Application filed March 13, 1908. Serial No. 420,869.

*To all whom it may concern:*

Be it known that I, LOUIS P. SCHRAMM, a citizen of the United States, residing at Toledo, in the county of Lucas and State of Ohio, have invented new and useful Improvements in Nut-Locks, of which the following is a specification.

This invention relates to nut locks, and the object of the invention is to provide a device of this character primarily intended for securing nuts upon axles.

The object of the invention is to provide a simple, cheap and effective device which may be readily and easily applied to the ordinary axle, and the invention consists in supplying the ordinary axle with a centrally disposed bore adapted for the reception of a locking element which is normally projected beyond the face of the axle by a suitable spring, and in providing the ordinary hollow axle nut with a non-circular opening adapted to be engaged by the spring pressed member and to effectively retain the nut in locked position upon the axle, the nut being readily removed from the axle, when desired, by simply forcing the locking element out of engagement with the nut by pressing it within the bore against the spring by a nail or other suitable instrument, and the nut revolved from engagement with the threaded extremity of the axle.

With these and other objects in view the invention resides in the novel construction of elements and their arrangement in operative combination, hereinafter fully described and claimed.

In the accompanying drawings, Figure 1 is a sectional view of an axle spindle having a retaining nut secured thereon by my improvement. Fig. 2 is an enlarged face view of the nut. Fig. 3 is an end elevation of the axle spindle and bushing. Fig. 4 is a detail perspective view of the locking element and the bushing.

In the accompanying drawings the numeral 1 designates an axle spindle of the ordinary construction and provided with the usual reduced threaded extremity 2. The threaded extremity 2 and the axle 1 are provided with a centrally arranged bore 3. This bore 3 is provided near its outer edge with a suitably threaded portion 4, adapted for engagement with a threaded bushing 5. The bushing 5 is provided with a non-circular passage 6, adapted for the reception of a non-circular locking element 7. This element 7 may be provided with a flange 8, and a rearwardly projecting portion 9 adapted for the reception of a helical spring 10 which normally forces the non-circular locking member 7 beyond the face of the threaded extremity 2.

A carriage nut 11 of the ordinary construction is employed. This nut 11 is provided with the usual interiorly arranged screw threaded portion adapted for engagement with the threaded extremity 2 of the axle spindle. The nut 11 is provided upon its face with a centrally arranged non-circular opening 12, adapted to coöperate with the non-circular member 7 when the nut is positioned upon the spindle.

From the above description it will be noted that I have provided an extremely simple and effective means for securely retaining a nut in locked position upon an axle, one which is automatic in action, as the spring pressed engaging element will readily engage the opening of the nut when the nut is screwed upon the axle spindle, one which may be readily and easily applied to any ordinary axle, and in which the ordinary carriage nut is effectively employed by simply providing a non-circular passage within its face.

Having thus fully described the invention what is claimed as new is:

The combination with an axle having a threaded extremity provided with a bore having threads for a portion of its length, a threaded bushing having a non-circular passage adapted for engagement within the bore, a non-circular member having a collar adapted to engage the passage of the bushing, a helical spring within the bore adapted to project the non-circular member beyond the end of the axle, and an interiorly threaded nut having a non-circular opening within its face.

In testimony whereof I affix my signature in presence of two witnesses.

LOUIS P. SCHRAMM.

Witnesses:
 ELLSWORTH M. BEARD,
 CORA L. FALLON.